US008304500B2

(12) United States Patent
Sato et al.

(10) Patent No.: US 8,304,500 B2
(45) Date of Patent: Nov. 6, 2012

(54) POLYGLYCOLIC ACID RESIN PARTICLE COMPOSITION AND PROCESS FOR PRODUCTION THEREOF

(75) Inventors: Hiroyuki Sato, Iwaki (JP); Fuminori Kobayashi, Iwaki (JP); Fumio Akutsu, Iwaki (JP); Katsushi Momose, Tokyo (JP)

(73) Assignee: Kureha Corporation, Tokyo (JP)

( * ) Notice: Subject to any disclaimer, the term of this patent is extended or adjusted under 35 U.S.C. 154(b) by 495 days.

(21) Appl. No.: 12/084,051

(22) PCT Filed: Oct. 26, 2006

(86) PCT No.: PCT/JP2006/321421
§ 371 (c)(1),
(2), (4) Date: Apr. 24, 2008

(87) PCT Pub. No.: WO2007/049721
PCT Pub. Date: May 3, 2007

(65) Prior Publication Data
US 2009/0131602 A1 May 21, 2009

(30) Foreign Application Priority Data
Oct. 28, 2005 (JP) ................................ 2005-314278

(51) Int. Cl.
*C08G 63/08* (2006.01)
(52) U.S. Cl. ........ 525/450; 525/410; 525/411; 525/415; 525/418; 528/354; 428/402
(58) Field of Classification Search .................. 525/410, 525/411, 415, 418, 450; 428/402; 528/354
See application file for complete search history.

(56) References Cited

U.S. PATENT DOCUMENTS

| 3,565,869 | A | * | 2/1971 | Prospero ........................ 528/483 |
| 4,889,119 | A | * | 12/1989 | Jamiolkowski et al. ...... 606/220 |
| 5,853,639 | A | * | 12/1998 | Kawakami et al. ....... 264/177.19 |
| 2003/0125431 | A1 | * | 7/2003 | Yamane et al. ............... 524/120 |
| 2006/0004183 | A1 | * | 1/2006 | Sato et al. .................... 528/354 |

FOREIGN PATENT DOCUMENTS

| EP | 1550682 | 7/2005 |
| JP | 2004-315610 | 11/2004 |
| JP | 10-060136 | 3/2010 |
| WO | 03037956 | 5/2003 |
| WO | 2004/033527 | * 4/2004 |
| WO | 2004033527 | 4/2004 |
| WO | WO 2004-033527 | * 4/2004 |
| WO | WO 2005/035623 | 10/2004 |
| WO | WO 2005/048894 | 11/2004 |
| WO | WO 2005/090438 | 3/2005 |
| WO | 2005035623 | 4/2005 |
| WO | 2005044894 | 5/2005 |
| WO | 2005072944 | 8/2005 |
| WO | 2005090438 | 9/2005 |

OTHER PUBLICATIONS

Utracki, Polymer Engineering and Science, Mid-Aug. 1983, pp. 602-609, vol. 23, No. 11.*
Colby, Macromolecules, 1987, 20, 2226-2237.*
International Search Report of PCT/JP2006/321421 mailed Jan. 30, 2007.
PCT International Preliminary Report on Patentability and Written Opinion of the International Searching Authority mailed Sep. 9, 2008, in English.
Supplementary European Search Report corresponding to EP Application No. EP 06822390.8 dated Aug. 19, 2010.
L.A. Utracki, Melt Flow of Polymer Blends, Polymer Engineering and Science, Mid-Aug. 1983, pp. 602-609, vol. 23, No. 11.
J.M. Ottino, et al., Laminar Mixing of Polymeric Liquids; A Brief Review and Recent Theoretical Developments, Polymer Engineering and Science, May 1983, pp. 357-379, vol. 23, No. 7.
J.C. McNeill, et al., Degradation Studies of Some Polyesters and Polycarbonates: 3-Polyglycollide, 1985, pp. 373-385, vol. 12.
Gabriel O. Shonaike, 9.4.2 Polymer Blend in Chapter 9, Gas Barrier Properties of Polymeric Materials, 2003, CRC Press.

* cited by examiner

*Primary Examiner* — Robert C Boyle
(74) *Attorney, Agent, or Firm* — Wenderoth, Lind & Ponack, L.L.P.

(57) ABSTRACT

A particulate polyglycolic acid resin composition, comprising: a blend of a first particulate polyglycolic acid resin and a second particulate polyglycolic acid resin each having a moisture content of at most 110 ppm and providing a ratio of melt-viscosity (as measured at 270° C. and a shear rate of 121 $sec^{-1}$; the same as hereinafter) therebetween of above 1 and at most 10. After the polymerization, the first and second particulate polyglycolic acid resins can cause change in properties before the forming (e.g., during storage); or during the forming process. However, by adequately determining the blending ratio between the resins while taking the melt-viscosities thereof into account, it becomes possible to provide a particulate polyglycolic acid resin composition showing a stable melt-formability and suitable as a starting material for various forming processes.

15 Claims, No Drawings

POLYGLYCOLIC ACID RESIN PARTICLE COMPOSITION AND PROCESS FOR PRODUCTION THEREOF

TECHNICAL FIELD

The present invention relates to a process for producing a particulate polyglycolic acid resin composition which is suitable as a starting material for various forming processes, such as injection molding, film forming, sheet forming, and blow molding.

BACKGROUND ART

Among aliphatic polyesters considered to give little load to the natural environment due to their biodegradability or hydrolyzability, polyglycolic acid resin has a particularly extensive decomposability, is excellent in mechanical strengths such as tensile strength and in gas-barrier property when formed into a film or sheet, and is therefore expected to be used as fishery materials, such as fishing yarns, fishery nets and culturing nets, agricultural material, or various packaging (container) materials (e.g., Patent documents 1-3 listed below). However, the severe hygroscopicity and hydrolyzability of polyglycolic acid resin have frequently provided a factor of obstructing the application thereof. For example, in the case of obtaining various forms, such as filament, film and sheet, an ordinary thermoplastic resin is generally melted, cooled, solidified and pelletized to obtain a particulate forming resin material, which is then supplied for various forming processes. This also holds true with polyglycolic acid resin but, as for polyglycolic acid resin having severe hygroscopicity (i.e., moisture absorptivity) and hydrolyzability, the resin is liable to cause lowerings of molecular weight and thus melt viscosity directly affecting the melt-formability due to hydrolysis thereof until it is subjected to various (melt-) forming processes during drying and storage after the polymerization, thus failing to exhibit desired formability in some cases. This is problematic even in the forming of polyglycolic acid resin alone but particularly in the forming of a composite material such as a laminate product with another thermoplastic resin as by co-extrusion. This is because an adjustment of formability can be performed without serious difficulty by adjusting melt-viscosity through an adjustment of melt-forming temperature, etc. in the case of forming of polyglycolic acid resin alone, whereas in the case of forming a composite material with another thermoplastic resin, the forming conditions cannot be freely changed corresponding to the change in melt-viscosity of the polyglycolic acid resin, thus being liable to result in product defects such as a change in relative thickness or a thickness irregularity of a laminate product.
Patent document 1: WO2003/037956A1
Patent document 2: JP10-60136A
Patent document 3: WO2005/072944A1

DISCLOSURE OF INVENTION

Accordingly, a principal object of the present invention is to provide a particulate polyglycolic acid resin composition, suitable as a material for various forming processes, showing a stable melt-formability in view of property changes before the forming, i.e., during storage, etc., after the polymerization or during the forming, and a process for production thereof.

According to the present inventors' study, for accomplishing the above object, it has been found effective to blend (at least) two species of particulate polyglycolic acid resins after adjusting their moisture contents and melt-viscosities respectively within certain ranges so as to suppress property changes during the forming and also in consideration of the melt-viscosity of an objective forming material.

Thus, according to the present invention, there is provided a particulate polyglycolic acid resin composition, comprising: a blend of a first particulate polyglycolic acid resin and a second particulate polyglycolic acid resin each having a moisture content of at most 110 ppm and providing a ratio of melt-viscosity (as measured at 270° C. and a shear rate of 121 $sec^{-1}$; the same as hereinafter) therebetween of above 1 and at most 10.

Further, the process for producing a particulate polyglycolic acid resin composition according to the present invention comprises: blending the above-mentioned first and second particulate polyglycolic acid resins.

Incidentally, according to the present inventors, it has been also found that a blend of two species of particulate polyglycolic acid resins exhibits a melt-viscosity, of which a logarithmic value is nearly equal to a weighted average of logarithmic values of melt-viscosities of the two species of particulate polyglycolic acid resins. Accordingly, based thereon, it is possible to determine a blend ratio of two species of particulate polyglycolic acid resins.

BEST MODE FOR PRACTICING THE INVENTION

Hereinbelow, the particulate polyglycolic acid resin composition according to the present invention will be described with reference to preferred embodiments thereof.

(Polyglycolic Acid Resin)

The polyglycolic acid resin (hereinafter, sometimes referred to as "PGA resin") includes homopolymer of glycolic acid (PGA, inclusive of a ring-opening polymerization product of glycolide (GL) which is a bimolecular cyclic ester of glycolic acid) consisting only of glycolic acid recurring unit represented by a formula of —(O.CH$_2$.CO)—, and also a glycolic acid copolymer containing at least 70 wt. % of the above-mentioned glycolic acid recurring unit.

Examples of comonomers for providing the polyglycolic acid copolymer together with the glycolic acid monomer such as glycolide, may include: cyclic monomers, inclusive of ethylene oxalate (i.e., 1,4-dioxane-2,3-dione); lactides; lactones, such as β-propiolactone, β-butyrolactone; pivalolactone, γ-butyrolactone, δ-valerolactone, β-methyl-δ-valerolactone, and ε-caprolactone; carbonates, such as trimethylene carbonate; ethers, such as 1,3-dioxane; ether-esters, such as dioxanone; and amides, such as ε-caprolactam; hydroxycarboxylic acids, such as lactic acid, 3-hydroxypropanoic acid, 4-hydroxybutanonic acid and 6-hydroxycaproic acid, and their alkyl esters; substantially equal molar mixtures of aliphatic diols, such as ethylene glycol and 1,4-butane diol with aliphatic dicarboxylic acids, such as succinic acid and adipic acid, and their alkyl or aromatic esters; and two or more species of these. These monomers may be replaced by polymers thereof which can be used as a starting material for providing a polyglycolic acid copolymer together with the above-mentioned glycolic acid monomer such as glycolide.

The above-mentioned glycolic acid recurring unit should occupy at least 70 wt. %, preferably at least 90 wt. %, of the PGA resin. If the content is too small, the strength or the gas-barrier property expected of PGA resin becomes scarce.

The PGA resin may preferably have a molecular weight (Mw (weight-average molecular weight based on polymethyl methacrylate)) of $3\times10^4$–$8\times10^5$, further $5\times10^4$–$5\times10^5$, particularly $6\times10^4$–$3\times10^5$, as measured by GPC measurement using hexafluoroisopropanol solvent. If the molecular weight is too small, the resultant form product is liable to have an insufficient strength. On the other hand, too large a molecular weight is liable to result in difficulties in melt-extrusion, forming and processing.

Such PGA resins as described may preferably be produced by bulk ring-opening polymerization of glycolide in the presence of ring-opening polymerization catalyst such as tin dichloride. By using water and/or alcohol as an initiator and molecular weight-adjusting agent, a PGA resin of a controlled molecular weight can be produced. Details of the bulk ring-opening polymerization of glycolide using water and/or alcohol as an initiator and a molecular weight-adjusting agent are disclosed in WO2004/033527A1 or WO2005/044894A1, and the disclosure of these patent documents are intended to be incorporated herein by reference, as desired.

Practically, the first and second particulate PGA resins are both regulated to have melt-viscosities (as measured at 270° C. and a shear rate of 121 sec$^{-1}$) in the range of 20-5000 Pa·s, particularly 50-3000 Pa·s. Further, the melt-viscosities of both resins are set so as to provide a ratio therebetween of above 1 and at most 10, preferably at most 3, further preferably in the range of 1.05-2. A ratio above 1.0 between the melt-viscosities of the first and second PGA resins means that their melt-viscosities are substantially different. This is because a principal object of the present invention is to provide a particulate PGA resin composition showing an intermediate melt-viscosity by blending a first particulate PGA resin showing, e.g., a relatively small melt-viscosity, and a second particulate PGA resin showing e.g., a relatively large melt-viscosity, and in order to provide a large effect of melt-viscosity adjustment, it is preferred that the melt-viscosity ratio is at least 1.05. On the other hand, if the melt-viscosity ratio exceeds 10, the influence of the particulate PGA resin having a lower melt-viscosity (lower molecular weight) appears noticeably, and the resultant composition is liable to show a melt-viscosity which is lower than a target melt-viscosity at a blend ratio between the first and second particulate PGA resins determined according to a method described hereinafter, so that the forming and processing of the composition becomes difficult. Further, because of a noticeable influence of the lower-molecular weight PGA resin constituting the particulate resin of a lower melt-viscosity.

More specifically, the present inventors have had a knowledge, as mentioned above, that with respect to a blend of two species of particulate polyglycolic acid resins showing a melt-viscosity ratio of at most 10, the blend exhibits a melt-viscosity, of which a logarithmic value is nearly equal to a weighted average of logarithmic values of melt-viscosities of the species of particulate polyglycolic acid resins.

Thus, according to a preferred embodiment of the present invention, the composition of the present invention is obtained by blending the first particulate polyglycolic acid resin showing a melt-viscosity of A [Pa·s] and the second particulate polyglycolic acid resin showing a melt-viscosity of B [Pa·s] at weight fractions of m1 and m2 (m1+m2=1), respectively, determined based on formula (1) below with respect to a target melt-viscosity of X [Pa·s]:

$$\log X = (m1 \times \log A + m2 \times \log B) \quad (1)$$

Herein, the term "based on" is used to mean that the weight fractions m1 and m2 can be increased or decreased by ca. 0.05, respectively as desired, in terms of a fraction with the proviso of m1+m2=1.

It is necessary that the first and second particulate PGA resins are dried and stored after the polymerization so as to retain a moisture content of at most 110 ppm, preferably at most 80 ppm, most preferably at most 50 ppm. This is because a particulate PGA resin having a moisture content in excess of 110 ppm can cause a lowering of melt-viscosity during the melt-forming. At a lower moisture content, the control at a desired melt-viscosity of the particulate PGA resin blend becomes easier.

The first and second particulate PGA resins need not have a chemically identical composition. For example, there may be conceived of a combination of glycolic acid homopolymer and a glycolic acid copolymer, or a combination of glycolic acid copolymers having different compositions.

It is also possible to blend a third particulate PGA resin having a similarly reduced moisture content in addition to the first and second particulate PGA resins. In an embodiment, for example, first and second particulate PGA resins both of polyglycolic acid homopolymer may be blended principally to adjust a melt-viscosity, and a third particulate PGA resin of glycolic acid copolymer may be used to adjust a composition while considering the resultant melt-viscosity. In this case, if a blend melt-viscosity of X [Pa·s] is attained by blending the first and second particulate PGA resins according to the above formula (1), a third particulate PGA resin showing a melt-viscosity of C [Pa·s] may be blended at a weight fraction of m3 (with the proviso of m1+m2=1) determined according to formula (2) below in order to obtain a target melt-viscosity of Y [Pa·s]:

$$\log Y = ((m1+m2) \times \log X + m3 \times \log C)/(m1+m2+m3) \quad (2).$$

However, it is also possible as a matter of course to blend such first to third particulate PGA resins simultaneously so as to satisfy m1+m2+m3=1. In this case, the first weight fraction m1 of the first particulate PGA resin may be set to an arbitrary value satisfying 0<m1<1, and the remaining m2 and m3 may be determined according to formula (3) below:

$$\log X = (m1 \times \log A + m2 \times \log B + m3 \times \log C) \quad (3).$$

The melt-viscosity C can be equal to one of the melt-viscosities A and B or different from any of A and B.

The particulate PGA resins used in the present invention may include pulverizates of polymers obtained through bulk polymerization as described above and also (cylindrical) pellets obtained through melting and re-pelletization as by cutting of the polymerizate. Such reformed pellets are preferred because a pulverizate can include much fine powder or particles formed by pulverization, which are liable to show a large hygroscopicity to result in a non-uniform property of the entire mass. In contrast thereto, the reformed pellets are caused to have a uniform shape (ordinarily of a short cylinder) and a uniform particle size, and also a uniformly small hygroscopicity, so that the property of the entire mass can be kept uniform until immediately before the forming. As a result, the resultant composition obtained by determination of a blend ratio according to the above-mentioned formula (1) is allowed to well agree to a target melt-viscosity, and also have a stable formability and processability.

Each of the first and second particulate PGA resins (and further an optional third particulate PGA resin) used in the present invention can be formed only of a PGA resin mentioned above, but it is preferred that at least one of them further contains a carboxyl group-capping agent and/or a thermal stabilizer in order to improve the moisture resistance and/or thermal stability of a final form product obtained from the composition of the present invention. These additives can be blended with the particulate PGA resins to provide a forming material prior to the forming but may preferably be added in a palletizing step and melt-mixed with the PGA resin to provide pellets. Particularly, by adding a thermal stabilizer prior to the melting of the PGA resin, it becomes possible to attain an effect of suppressing the increase of glycolide content during the melting (and mixing) process of the PGA resin composition.

As the carboxyl group-capping agent, it is generally possible to use compounds having a function of capping a carboxyl terminal and known as an agent for improving moisture resistance of aliphatic polyesters, such as polylactic acid. Examples thereof may include: carbodiimide compounds inclusive of monocarbodiimides and polycarbodiimides, such as N,N-2,6-diisopropylphenylcarbodiimide; oxazoline compounds, such as 2,2'-m-phenylene-bis(2-oxazoline), 2,2'-p-phenylene-bis(2-oxazoline), 2-phenyl-2-oxagoline, and styrene-isopropenyl-2-oxazoline; oxazine compounds, such as 2-methoxy-5,6-dihydro-4H-1,3-oxazine; and epoxy compounds, such as N-glycidylphthalimide, cyclohexene oxide, and tris (2,3-epoxypropyl)isocyanurate. Among these, carbodiimide compounds and epoxy compounds are preferred. These carboxyl group-capping agents can be used in combination of two or more species as desired, and may preferably be used in a proportion of 0.01-10 wt. parts, further preferably 0.1-2 wt. parts, particularly preferably 0.2-1 wt. part, per 100 wt. parts of the PGA resin.

Further, preferred examples of the thermal stabilizer may include: phosphoric acid esters having a pentaerythritol skeleton and alkyl phosphate or phosphite esters having an alkyl group of preferably 8-24 carbon atoms, and some preferred specific examples thereof are disclosed in WO2003/037956A1 (the disclosure of which is intended to be incorporated herein by reference). These thermal stabilizers may preferably be used in a proportion of at most 3 wt. parts, more preferably 0.003-1 wt. part, per 100 wt. parts of the PGA resin.

For the pelletization, the particulate PGA resin and the thermal stabilizer may be subjected to melting (and mixing) by heating to a temperature range of preferably 230-280° C., more preferably 240-270° C. The melting (and mixing) means may basically be any one, inclusive of a stirring machine and a continuous kneader, but may preferably comprise an extruder (e.g., an equi-directionally rotating twin-screw extruder or a reverse-directionally rotating twin-screw extruder) allowing a short-time processing and a smooth transfer to a subsequent cooling step for the heat-melting (and mixing) therein. If the heat-melting temperature is below 230° C., the effect of additives, such as the carboxyl group-capping agent and thermal stabilizer, is liable to be insufficient. On the other hand, in excess of 280° C., the PGA resin pellets are liable to be colored.

The melted (and mixed) PGA resin extrudate (strands) may be cooled with air or water but may preferable be subjected to cooling with water in order to prevent the distortion of the strands after solidification thereof and uniformize the size of the pellets formed by cutting.

Prior to the cooling with water of the PGA resin melt (mixture), the glycolide content in the molten PGA resin composition should preferably be suppressed to at most 0.6 wt. %, more preferably at most 0.3 wt. %, so as to suppress the hydrolysis of the PGA resin during the water cooling. For the suppression of the glycolide content in the molten PGA resin composition, any of (a) lowering in glycolide content in the starting PGA resin, (b) the incorporation of a thermal stabilizer as descried above, and (c) discharge of glycolide having a relatively low boiling point, e.g., through a vent port of an extruder for the melt-mixing, is effective, and by appropriately combining these measures, the glycolide content of at most 0.6 wt. % is accomplished. It is particularly preferred to lower the glycolide content of the starting PGA resin composition (a) in advance to below 0.5 wt. %, further at most 0.3 wt. %, particularly at most 0.2 wt. %. In order to obtain such a PGA resin having a low glycolide content, it is preferred to apply a ring-opening polymerization of glycolide wherein at least a latter period of the polymerization is proceeded by way of solid-phase polymerization, and the resultant PGA resin is subjected to removal of glycolide by release to a gas phase (as disclosed in WO2005/090438A1).

In case where the crystallization in the cooling step of PGA resin composition is insufficient, it is possible to place an additional step for promoting the crystallization after solidification by the cooling and before the pelletization and/or after the pelletization. The medium for this purpose may suitably be an aqueous medium at a temperature in a temperature range of from the Tg of PGA resin composition to ca. 100° C., or heated air at a somewhat higher temperature.

The strands after the cooling and solidification may be formed into pellets, e.g., by cutting with a cutter. The thus-formed first and second particulate PGA resins (and further a third particulate PGA resin) representatively in the form of pellets may respectively be adjusted to particle sizes (true sphere-equivalent diameters based on volumes in the case of cylindrical pellets) of ca. 1-4 mm and optionally dried to be stored so as to retain a moisture content of at most 110 ppm until before the forming. Then, based on melt-viscosities A and B [Pa·s] thereof before the forming, the first and second (and third) particulate PGA resins are blended at weight fractions m1 and m2 (and m3) so as to provide a target melt-viscosity X [Pa·s] according to the above-mentioned formula (1) (and (2)), thereby providing a particulate PGA resin composition according to the present invention. The thus-obtained composition may be subjected to various forming processes, such as injection molding, film forming, sheet forming or blow molding, by itself, or a composite forming process, e.g., in the form of a laminate, to provide a form product.

The particulate PGA resin composition according to the present invention comprising the above-mentioned first and second (and third) particulate PGA resins may be used as it is in a form of such a particulate mixture as a starting material for various forming processes but can also be preferably used after melt-mixing of these resins and re-pelletized into melt-mixed pellets having particle sizes of 1-4 mm from the viewpoint of stabilization of the forming conditions.

For the blending of the first and second (and third) particulate PGA resins for obtaining the particulate PGA resin composition of the present invention, conventional dry-blending apparatus may be used including, as specific examples thereof, tumblers, ribbon blenders, high-speed mixers and Nauta mixer. In order to obviate moisture absorption of the particulate PGA resins during the blending, it is preferred to effect a pre-blending operation, such as flowing of dry air into the blending apparatus. The blending may ordinarily be performed at room temperature, but an elevated temperature up to ca. 200° C. can be tolerated as far the present invention is not adversely affected thereby.

In the present invention, it is possible to use a filler in order to provide an improved mechanical strength and other properties to the form product by incorporation into at least one of the first and second (and third) particulate resins or by blending with the particulate resins. The filler is not particularly limited in species but may be in the form of fiber, plates, powder or particles. Specific examples thereof may include: fiber or whisker form fillers, such as glass fiber, PAN-based and pitch-based carbon fiber metal fiber, such as stainless steel fiber, aluminum fiber and brass fiber, natural fiber of chitin, chitosan, cellulose, cotton, etc., organic synthetic fiber such as aromatic polyamide fiber, gypsum fiber, ceramic fiber, asbestos fiber, zirconia fiber, alumina fiber, silica fiber, titanium oxide fiber, silicon carbide fiber, rock wool, potassium titanate whisker, barium titanate whisker, aluminum borate whisker, and silicon nitride whisker; and powdery, particulate and plate-like fillers of natural inorganic minerals, such as mica, talc, kaolin, silica and sand, calcium carbonate, glass beads, glass flake, glass micro-balloon, clay, molybdenum disulfide, wallastenite, montmorillonite, titanium oxide, zinc oxide, calcium polyphosphate and graphite. Any type of glass fiber can be used without particular restriction as far as it is generally usable for reinforcement of resins, and can be selected from chopped strands of long fiber type and short fiber type, and milled fiber. The above-mentioned fillers can be used in two or more species in combination. Incidentally, these fillers can be used after surface treatment thereof with known coupling agents, such as silane coupling agents and titanate coupling agents, and other surface treating agents. Further, the glass fiber can be coated or bundled with a thermoplastic resin, such as ethylene/vinyl acetate copolymer, or a thermosetting resin such as epoxy resin. The filler may be added in 0.1-100 wt. parts, preferably 1-50 wt. parts, per 100 wt. parts of the PGA resin.

EXAMPLES

Hereinbelow, the present invention will be described more specifically based on Examples and Comparative Examples. The physical properties (or values) described in the present specification including the following description are based on those measured according to the following methods.

(1) Molecular Weight Measurement

Ca. 5 g of a sample particulate PGA resin was sandwiched between aluminum plates and heated for 3 minutes on a heat press machine at 260° C. Then, the sample was held for ca. 5 minutes under a pressure of 5 MPa, then immediately transferred to a press machine cooled with circulating water and held for ca. 5 minutes under a pressure of 5 MPa to form a transparent amorphous sheet.

From the above-prepared press sheet, ca. 10 mg of a sample was cut out and was dissolved in 10 ml of hexafluoroisopropanol (HFIP) containing sodium trifluoroacetate dissolved therein at 5 mM. Then, 20 μl of the resultant sample solution was filtrated through a 0.1 μm-membrane filter made of polytetrafluoroethylene and then injected into a gel permeation chromatography (GPC) apparatus for measurement of molecular weight under the following conditions. Incidentally, the sample was injected into the GPC apparatus within 30 minute after the dissolution.

<GPC Measurement Conditions>
Apparatus: "Shodex-104" made by Showa Denko K.K.
Column: Two columns of "HFIP-606M" were connected in series with 1 column of "HFIP-G" as a pre-column.
Column temperature: 40° C.
Elution liquid: HFIP solution containing sodium trifluoroacetate dissolved at 5 mM.
Flow rate: 0.6 ml/min.
Detector: RI (differential refractive index) detector.
Molecular weight calibration: Effected by using 5 species of standard polymethyl methacrylate having different molecular weights.

(2) Melt Viscosity Measurement

A melt-viscosity of a sample PGA resin was measured at a measurement temperature of 270° C. and a shear rate of 121 $sec^{-1}$ by means of a measurement apparatus ("CAPILOGRAPH 1-C", made by K.K. Toyo Seiki) equipped with a capillary of 1 mm-dia.×10 mm-L.

(3) Moisture Content Measurement

A Karl Fischer moisture meter ("CA-100", made by Mitsubishi Kagaku K.K.) equipped with an evaporator ("VA-100") was used, and a sample PGA resin accurately weighed at ca. 2 g was placed in the evaporator preliminarily set to 220° C. Dry nitrogen gas was flowed at a rate of 250 ml/min. from the evaporator to the Karl Fischer moisture meter. After the introduction of the sample into the evaporator, evaporated water was introduced into Karl Fischer liquid until a termination point determined by a lowering of electroconductivity down to 0.1 mV above the background.

(4) Moisture Resistance Evaluation

Ca. 1 g of a pellet sample was sandwiched between aluminum plates and heated for 3 minutes on heat press machine at 260° C. Then, the sample was held for 1 minute under a pressure of 5 MPa and then immediately transferred to a press machine cooled with circulating water to be cooled to form a transparent amorphous press sheet. The press sheet thus formed was then heat-treated for 10 minutes at 80° C. in the state of being sandwiched between the aluminum plates.

Ca. 10 mg of a sample was cut out from the press sheet prepared through the above operation and held for 3 days in a constant temperature and humidity chamber held at a temperature of 50° C. and relative humidity of 90%. The sample was taken out after the 3 days and measured with respect to a molecular weight by gel permeation chromatography (GPC). A molecular weight retentivity was calculated from the measured molecular weight and a molecular weight of sample before being placed in the constant temperature and humidity chamber, and a moisture resistance was evaluated based on the molecular weight retentivity.

(5) Residual glycolide content

Ca. 300 mg of a sample was dissolved in ca. 6 g of dimethyl sulfoxide (DMSO) by heating at 150° C. for ca. 10 min., followed by cooling down to room temperature and filtration. To the filtrate, prescribed amounts of 4-chlorobenzene as an internal standard and acetone were added. Then, 2 μl of the solution was injected to a GPC apparatus for measurement. From a value obtained by the measurement, a residual glycolide content was determined in terms of wt. % in the sample polymer.

Apparatus: "GC-2010" made by K.K. Shimadzu Seisakusho)
Column: "TC-17" (0.25 mm in diameter×30 mm in length).
Column temperature: Held at 150° C. for 5 min., heated at 270° C. at a rate of 20° C./min. and then held at 270° C. for 3 min.
Gasification chamber temperature: 180° C.
Detector: FID (hydrogen flame ionization detector) at temperature of 300° C.

PGA Pellet Preparation Examples

Ex. 1

Into a hermetically closable SUS-made vessel equipped with a steam jacket structure and a stirrer, 450 kg of glycolide (made by Kureha Corporation; containing 360 ppm of glycolic acid dimer and 13 ppm of water) and 1600 g of dodecyl alcohol were added, then 13.5 g (30 ppm) of tin dichloride dihydrate was added and, after closing the vessel, steam was circulated in the jacket to heat the contents up to a temperature of 100° C., thereby forming a uniform liquid. While keeping the temperature at 100° C., the contents were transferred to an apparatus comprising metal (SUS304)-made tubes having an inner diameter of 28 mm. Immediately after completing the transfer of the glycolide into the tubes, an upper plate was affixed. The body part held for 7 hours under circulation of a heat medium oil at 170° C., and lumps of polyglycolic acid (PGA) were obtained and pulverized by a pulverizer.

The thus-obtained PGA pulverizate was placed in a drier into which dry air with a dew point of −50° C. was blown to effect 12 hours of drying at 120° C. Moisture content after the drying was 42 ppm.

To the thus-obtained PGA pulverizate, 300 ppm (based on PGA) of a nearly equi-molar mixture of mono- and di-stearyl acid phosphate ("AX-71", made by Asahi Denka Kogyo K.K.) as a thermal stabilizer and 0.5 wt. % (based on PGA) of N,N-2,6-diisopropylphenylcarbodiimide (CDI) (made by Kawaguchi Kagaku Kogyo K.K.) were respectively added, and the mixture was melt-extruded through a twin-screw extruder ("TEM-41SS", made by Toshiba Kikai K.K.) having zones C1-C10 and a die from the feed port to the discharge port set at temperatures of 200° C. (C1), 230° C. (C2), 260° C. (C3), 270° C. (C4-C7), 250° C. (C8), 240° C. (C9) and 230° C. (C10 and the die) to obtain PGA pellets having an average particle size of ca. 2.8 mm. The PGA pellets were placed in a drier into which dry air with a dew point of −50° C. was blown to effect 17 hours of heat treatment at 170° C., thereby obtaining PGA pellet A, which exhibited a melt-viscosity of 710 Pa·s and a moisture content of 27 ppm.

The outline of the above-mentioned PGA Pellet Preparation Example 1 is inclusively shown in Table 1 appearing hereinafter together with those of Preparation Examples described below.

Ex. 2

PGA pellet B having a melt-viscosity of 70 Pa·s and a moisture content of 36 ppm was prepared in the same manner as in the above Ex. 1 except for changing the amount of n-dodecyl alcohol from 1600 g to 2430 g.

Ex. 3

PGA pellet C having a melt-viscosity of 510 Pa·s and a moisture content of 12 ppm was prepared in the same manner as in the above Ex. 1 except for changing the amount of n-dodecyl alcohol from 1600 g to 1841 g.

Ex. 4

PGA pellet D having a melt-viscosity of 600 Pa·s and a moisture content of 12 ppm was prepared in the same manner as in the above Ex. 1 except for changing the amount of n-dodecyl alcohol from 1600 g to 1697 g.

Ex. 5

PGA pellet E having a melt-viscosity of 680 Pa·s and a moisture content of 20 ppm was prepared in the same manner as in the above Ex. 1 except for changing the amount of n-dodecyl alcohol from 1600 g to 1625 g.

Ex. 6

PGA pellet F having a melt-viscosity of 740 Pa·s and a moisture content of 34 ppm was prepared in the same manner as in the above Ex. 1 except for changing the amount of n-dodecyl alcohol from 1600 g to 1589 g.

Ex. 7

PGA pellet G having a melt-viscosity of 790 Pa·s and a moisture content of 25 ppm was prepared in the same manner as in the above Ex. 1 except for changing the amount of n-dodecyl alcohol from 1600 g to 1553 g.

Ex. 8

PGA pellet H having a melt-viscosity of 950 Pa·s and a moisture content of 22 ppm was prepared in the same manner as in the above Ex. 1 except for changing the amount of n-dodecyl alcohol from 1600 g to 950 g.

Ex. 9

PGA pellet I having a melt-viscosity of 3000 Pa·s and a moisture content of 10 ppm was prepared in the same manner as in the above Ex. 1 except for changing the amount of n-dodecyl alcohol from 1600 g to 503 g.

Ex. 10

PGA pellet J having a melt-viscosity of 620 Pa·s and a moisture content of 24 ppm was prepared in the same manner as in the above Ex. 1 except for using air with a dew point of −30° C. for drying the PGA pulverizate. Due to a slight increase of moisture corresponding to an increase of dew point by 20° C., the hydrolysis of PGA was caused so that the melt-viscosity of the thus-obtained pellet J was lowered from the melt-viscosity 710 Pa·s of the pellet A of Ex. 1

Ex. 11

PGA pellet K having a melt-viscosity of 460 Pa·s and a moisture content of 31 ppm was prepared in the same manner as in Ex. 1 except for changing the conditions for drying the PGA pulverizate to 2 hours at 120° C. In the course of the preparation, the pulverizate showed a moisture content of 130 ppm. The lowering of melt-viscosity may be attributable to hydrolysis of PGA in the melt-kneading step in the extruder for the pelletization due to an increased moisture content of the pulverizate.

The results of the above Ex. 11-12 show that, without strict control of the conditions for drying the PGA resin pulverizate obtained by bulk polymerization, the moisture content in the pulverizate is increased and the melt-viscosity of the PGA resin is liable to be lowered so that the accurate control and management of melt-viscosity becomes difficult.

The outlines of the above Pellet Preparation Examples are inclusively shown in the following Table 1.

TABLE 1

| | Pellet Preparation Ex. | | | | | | | | | | |
|---|---|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
| Amount of n-dodecyl alcohol (g) | 1600 | 2430 | 1841 | 1697 | 1625 | 1589 | 1553 | 950 | 503 | 1600 | 1600 |
| Dew point of drying air (° C.) | −50 | −50 | −50 | −50 | −50 | −50 | −50 | −50 | −50 | −30 | −50 |
| Drying time (hours) | 12 | 12 | 12 | 12 | 12 | 12 | 12 | 12 | 12 | 12 | 1 |

TABLE 1-continued

| | Pellet Preparation Ex. | | | | | | | | | | |
|---|---|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
| Moisture content of pulverizate (ppm) | 42 | 44 | 28 | 33 | 30 | 29 | 44 | 39 | 43 | 49 | 130 |
| Pellet viscosity (Pa·s) | 710 | 70 | 510 | 600 | 680 | 740 | 790 | 950 | 3000 | 620 | 260 |
| Pellet moisture content (ppm) | 27 | 36 | 20 | 12 | 20 | 34 | 25 | 22 | 10 | 24 | 31 |
| Pellet name | A | B | C | D | E | F | G | H | I | J | K |
| Residual glycolide content (wt %) | 0.06 | 0.20 | 0.03 | 0.08 | 0.06 | 0.05 | 0.10 | 0.07 | 0.06 | — | — |

Example 1

For providing a target melt-viscosity of 700 Pa·s according to above-mentioned formula (1) by using PGA pellet E (melt-viscosity: 680 Pa·s, moisture content: 20 ppm) obtained in the above Ex. 5 (pellet preparation) and PGA pellet F (melt-viscosity: 74 Pa·s, moisture content: 34 ppm), the weight fractions m1 and m2 therefor were obtained through a calculation as shown below:

$$\log 700 = m1 \times \log 680 + m2 \times \log 740.$$

As m1+m2=1, the above equation can be converted into:

$$\log 700 = m1 \times \log 680 + (1-m) \times \log 740,$$

which can be further reformed into:

$$m1 = (\log 700 - \log 740)/(\log 680 - \log 740) = 0.66$$

Accordingly, m2 is calculated as m2=1−0.66=0.34.

Accordingly, the pellet E and the pellet F were changed at a weight ratio of 66:34 into a dry powder blender ("RFD-30(S)CD/MC", made by Aichi Denki K.K.) of which the interior was sufficiently dried by blowing of dry air (dew point: −50° C.) and, under a hermetically closed state after closing the lid, the blender was rotated for ca. 20 min. at room temperature, thereby obtaining a pellet blend.

The pellet blend exhibited a melt-viscosity of 710 Pa·s, a moisture content of 34 ppm, a weight-average molecular weight of 226000 and a moisture resistance (i.e., a molecular weight retentivity after 3 days of is standing in an environment of temperature: 50° C. and a relative humidity: 90%) of 67%. The PGA pellet blend was used together with polyethylene terephthalate (PET) for injection molding of a three-layer laminate in the following manner.

More specifically, a multi-layer injection molding machine (made by Husky Co., USA) equipped with a character U-shaped mold for molding a perform of an injection blow bottle and two resin supply cylinders was used for forming inner and outer layers of PET ("1011,", made by KoSa Co.; melt-viscosity: 725 Pa·s) through one cylinder and for forming a core layer of the above-prepared pellet blend through the other cylinder by simultaneous injection of the resins into the U-shaped mold at 250° C. to form a character U-shaped parison having a length of ca. 81 mm, an outer diameter of ca. 22 mm and a thickness at the body portion of ca. 3.7 mm (including inner to outer layer thickness ratios of 8.75/1/8.75). At an injection molding pressure of 2.46 MPa, a U-shaped parison having a good thickness distribution was produced.

The outline of Example 1 is shown in Table 2 appearing hereinafter together with those of Examples and Comparative Examples described below.

Example 2

A pellet blend was prepared and used for injection molding in the same manner as in Example 1 except for blending the pellet D (melt-viscosity: 600 Pa·s and moisture content: 12 ppm) obtained in Ex. 4 (pellet preparation) and the pellet G (melt-viscosity: 790 Pa·s, moisture content: 25 ppm) obtained in Ex. 7 at a weight ratio of 43:57 determined based on the above formula (1) so as to provide a target melt-viscosity of 700 Pa·s. As a result thereof, a U-shaped parison having a good thickness distribution similarly as in Example 1 was obtained.

Example 3

A pellet blend was prepared and used for injection molding in the same manner as in Example 1 except for blending the pellet C (melt-viscosity: 510 Pa·s and moisture content: 20 ppm) obtained in Ex. 3 (pellet preparation) and the pellet H (melt-viscosity: 950 Pa·s, moisture content: 25 ppm) obtained in Ex. 8 at a weight ratio of 48:52 determined based on the above formula (1) so as to provide a target melt-viscosity of 700 Pa·s. As a result thereof, a U-shaped parison having a good thickness distribution similarly as in Example 1 was obtained.

Example 4

The PGA pellet E obtained in Ex. 5 (pellet preparation) and the pellet F obtained in Ex. 6 were charged at a ratio of 66:34 into a dry powder blender ("RFD-30(S) CD/MC) of which the interior was sufficiently dried by blowing dry air (due point: −50° C.) and, under a hermetically closed state after closing the lid, the blender was rotated for ca. 20 min. at room temperature, thereby obtaining a pellet blend. The pellet blend was melt-extruded through a twin-screw extruder ("TEM-41SS", made by Toshiba Kikai K.K.) having zones C1-C10 and a die from the feed port to the discharge port set at temperatures of 200° C. (C1), 230° C. (C2), 260° C. (C3), 270° C. (C4-C7), 250° C. (C8), 240° C. (C9) and 230° C. (C10 and the die) to obtain PGA pellets having an average particle size of ca. 2.8 mm, and the pellets were used for injection molding in the same manner as in Example 1. As a result thereof, a U-shaped parison having a good thickness distribution similarly as in Example 1 was obtained.

Example 5

A pellet blend was prepared and used for injection molding in the same manner as in Example 1 except for blending the pellet C (melt-viscosity: 510 Pa·s and moisture content: 20 ppm) obtained in Ex. 3 (pellet preparation), the pellet H (melt-viscosity: 600 Pa·s, moisture content: 25 ppm) obtained in Ex. 8 and the pellet D (melt-viscosity: 600 Pa·s, moisture content: 12 ppm) at weight ratios of 30:50:20 determined so as to provide a target melt-viscosity of 700 Pa·s. As a result thereof, a U-shaped parison having a good thickness distribution similarly as in Example 1 was obtained.

Comparative Example 1

A three-layer injection molding with PET was performed in the same manner as in Example 1 except for using the PGA pellet K (melt-viscosity: 460 Pa·s, moisture content: 31 ppm) obtained in Ex. 11 (pellet preparation) alone instead of the pellet blend. As a result, the injection molding was difficult because of a large melt-viscosity difference with PET (melt-viscosity: 725 Pa·s).

Comparative Example 2

A pellet EE (melt-viscosity: 680 Pa·s, moisture content: 130 ppm) was obtained by leaving the pellet E (melt-viscosity: 680 Pa·s, moisture content: 20 ppm) in contact with the atmosphere. A pellet blend was prepared and used for injection molding in the same manner as in Example 1 except for blending the pellet EE and the pellet F (melt-viscosity: 740 Pa·s, moisture content: 34 ppm) obtained in Ex. 6 at a weight ratio of 43:57 determined based on the above formula (1) so as to provide a target melt-viscosity of 700 Pa·s.

The pellet blend exhibited 530 Pa·s which was lower than 710 Pa·s in Example 1. As a result, the injection molding was difficult.

Comparative Example 3

A pellet blend was prepared and used for injection molding similarly as in Example 4 except for blending the pellet EE and the pellet F in Comparative Example 2 at a weight ratio of 43:57.

Because of a large moisture content of the pellet EE, the viscosity was lowered during the melt-forming, so that the resultant pellet blend exhibited a melt-viscosity of 530 Pa·s, which was lowered than 700 Pa·s of Example 4. As a result, the injection molding was difficult.

Comparative Example 4

A pellet blend was prepared and used for injection molding in the same manner as in Example 4 except for blending the pellet B (melt-viscosity: 70 Pa·s and moisture content: 36 ppm) obtained in Ex. 2 (pellet preparation) and the pellet I (melt-viscosity: 3000 Pa·s, moisture content: 10 ppm) obtained in Ex. 9 at a weight ratio of 43:57 determined based on the above formula (1) so as to provide a target melt-viscosity of 700 Pa·s.

Because of a large melt-viscosity difference between the pellet B and the pellet I, the injection molding pressure was lowered to cause a thickening of the PGA layer around a neck portion of the U-shaped parison, thus resulting in only a parison having a poor thickness distribution. The thus-obtained pellet blend exhibited a low moisture resistance as represented by a low molecular weight retentivity of 40% after 3 days of standing in a high temperature—high humidity environment (50° C., 90% RH). This is understood to represent a lower moisture resistance due to an increased amount of low-molecular weight PGA.

The outlines of the above Examples and Comparative Examples are inclusively shown in the following Table 2.

TABLE 2

|  |  |  | Pellet name | | | | | | | | | |
|---|---|---|---|---|---|---|---|---|---|---|---|---|
|  |  |  | E | D | C | E | C | K | EE | EE | B |
| First PGA pellet before blending | Melt-viscosity | Pa·s | 680 | 600 | 510 | 680 | 510 | 460 | 680 | 680 | 70 |
|  | Blend ratio | wt. % | 66 | 44 | 49 | 66 | 30 |  | 66 | 66 | 39 |
|  | Moisture content | ppm | 20 | 12 | 20 | 20 | 20 | 31 | 130 | 130 | 36 |
|  | Pellet name |  | F | G | H | F | D |  | F | F | I |
| Second PGA pellet before blending | Melt-viscosity | Pa·s | 740 | 790 | 950 | 74 | 600 |  | 740 | 740 | 3000 |
|  | Blend ratio | wt. % | 34 | 56 | 51 | 34 | 20 |  | 34 | 34 | 61 |
|  | Moisture content | ppm | 34 | 25 | 22 | 34 | 12 |  | 34 | 34 | 10 |
| Melt-viscosity ratio of pellet 2/pellet 1 | | (—) | 1.1 | 1.32 | 1.86 | 1.1 | 1.18 | — | 1.09 | 1.09 | 42.9 |
| Properties of pellet blend | Viscosity of blend | Pa·s | 710 | 720 | 690 | 700 | 700 | 460 | 530 | 530 | 700 |
|  | Moisture content | ppm | 26 | 21 | 22 | 24 | 22 | 31 | 105 | 40 | 22 |
|  | Weight-average molecular weight | ×10$^4$ | 22.6 | 22.4 | 22.3 | 22.5 | 22.4 | 19.4 | 20.4 | 20.6 | 22.1 |
|  | Injection pressure | MPa | 2.46 | 2.36 | 2.35 | 2.44 | 2.44 |  |  |  | 1.59 |
|  | Moisture resistance | % | 67 | 60 | 57 | 66 | 65 |  |  |  | 40 |

* In Example 5, the following third PGA pellet was further blended.
Pellet name     H
Melt-viscosity     950 [Pa · s]
Blend ratio     50 [wt. %]
Moisture content     22 [ppm]

INDUSTRIAL APPLICABILITY

As described above, the present invention provides a particulate polyglycolic acid resin composition, suitable as a material for various forming processes, showing a stable formability, by blending at least two particulate polyglycolic acid resins each having a moisture content and a melt-viscosity within specified ranges in consideration of a target viscosity of the forming material, in view of the difficulty in management of melt-formability due to hygroscopicity and hydrolyzability of PGA resin.

The invention claimed is:

1. A particulate polyglycolic acid resin blend comprising:
a first particulate polyglycolic acid resin and a second particulate polyglycolic acid resin each in a form of pellets and having a moisture content of at most 110 ppm,
wherein:
the first and second particulate polyglycolic acid resins have a first measured melt-viscosity and a second measured melt viscosity, respectively, as measured at 270° C. and a shear rate of 121 sec$^{-1}$, thus providing a ratio therebetween of at least 1.05 and at most 3,
the first and the second particulate polyglycolic acid resins are identical to each other in chemical composition,
at least one of the first particulate polyglycolic acid resin and the second particulate polyglycolic acid resin comprises a thermal stabilizer, and
the first particulate polyglycolic acid resin and the second particulate polyglycolic acid resin have particle sizes of 1-4 mm.

2. The blend according to claim 1, wherein each of the first particulate polyglycolic acid resin and the second particulate polyglycolic acid resin has a moisture content of at most 50 ppm.

3. The blend according to claim 1, comprising the first particulate polyglycolic acid resin showing a melt-viscosity of A [Pa·s] and the second particulate polyglycolic acid resin showing a melt-viscosity of B [Pa·s] at weight fractions of m1 and m2 (m1+m2=1), respectively, determined based on formula (1) below with respect to a target melt-viscosity of X [Pa·s] in a range of 20-5000 [Pa·s]:

$$\log X = (m1 \times \log A + m2 \times \log B) \quad (1).$$

4. The blend according to claim 1, wherein at least one of the first particulate polyglycolic acid resin and the second particulate polyglycolic acid resin further comprises a carboxylate group-capping agent.

5. The blend according to claim 1, wherein each of the first particulate polyglycolic acid resin and the second particulate polyglycolic acid resin has a residual glycolide content of below 0.5 wt. %.

6. The blend according to claim 1, wherein the first particulate polyglycolic acid resin and the second particulate polyglycolic acid resin have been melt-mixed and re-pelletized.

7. A process for producing the particulate polyglycolic acid resin blend of claim 1, comprising: blending the first particulate polyglycolic acid resin and the second particulate polyglycolic acid resin, and providing a ratio of melt-viscosity therebetween of at least 1.05 and at most 3.

8. The production process according to claim 7, comprising: blending the first particulate polyglycolic acid resin showing a melt-viscosity of A [Pa·s] and the second particulate polyglycolic acid resin showing a melt-viscosity of B [Pa·s] at weight fractions of m1 and m2 (m1+m2=1), respectively, determined based on formula (1) below with respect to a target melt-viscosity of X [Pa·s]:

$$\log X = (m1 \times \log A + m2 \times \log B) \quad (1).$$

9. The production process according to claim 8, further comprising blending a third particulate polyglycolic acid resin having a melt-viscosity of C [Pa·s] at a weight fraction determined by formula (2) below so as to provide a target viscosity Y [Pa·s]:

$$\log Y = ((m1+m2) \times \log X + m3 \times \log C)/(m1+m2+m3) \quad (2).$$

10. The production process according to claim 7, comprising: blending the first particulate polyglycolic acid resin having a melt-viscosity of A [Pa·s], the second particulate polyglycolic acid resin having a melt-viscosity of B [Pa·s] and a third particulate polyglycolic acid resin having a melt-viscosity of C [Pa·s] at weight fractions of m1, m2 and m3 (m1+m2+m3=1), respectively, wherein m1 is first set to an arbitrary value satisfying 0<m<1, and the remaining m2 and m3 are set to values determined by formula (3) below with respect to a target melt-viscosity of X [Pa·s]:

$$\log X = (m1 \times \log A + m2 \times \log B + m3 \times \log C) \quad (3).$$

11. The production process according to claim 7, wherein at least one of the first, the second (and optionally a third) particulate polyglycolic acid resins further comprises a carboxyl group-capping agent.

12. The production process according to claim 7, wherein the first particulate polyglycolic acid resin and the second particulate polyglycolic acid resin are melt-mixed and re-pelletized.

13. The production process according to claim 12, wherein strands as an extrudate of the melt-mixed composition are cooled to be solidified and pelletized by cutting.

14. The production process according to claim 13, wherein the strands are cooled by cooling with water.

15. The production process according to claim 12, further comprising a step of promoting crystallization of the composition before or/and after the pelletization.

* * * * *